E. M. CHAPMAN & C. E. COWAN.
ELEVATING TRUCK.
APPLICATION FILED MAY 22, 1913.

1,118,740.

Patented Nov. 24, 1914.

WITNESSES

INVENTORS
Eugene M Chapman
Charles E Cowan
BY
ATTORNEYS

UNITED STATES PATENT OFFICE.

EUGENE MERVIN CHAPMAN AND CHARLES EDWARD COWAN, OF HOLYOKE, MASSACHUSETTS.

ELEVATING-TRUCK.

1,118,740.

Specification of Letters Patent. Patented Nov. 24, 1914.

Application filed May 22, 1913. Serial No. 769,206.

*To all whom it may concern:*

Be it known that we, EUGENE M. CHAPMAN and CHARLES E. COWAN, citizens of the United States, and residents of Holyoke, in the county of Hampden and State of Massachusetts, have invented certain new and useful Improvements in Elevating-Trucks, of which the following is a specification.

Our present invention relates to elevating trucks which are utilized to raise and transport various articles of considerable weight which are supported a sufficient distance from the surface on which they stand to enable the placing of the lowered truck therebeneath, for instance, stoves, safes and the like, our object being to provide a truck of this character which is particularly adapted to elevate and transport skid carried piles or stacks of paper, the structure to this end being such that a maximum leverage may be applied through the handle to raise the platform of the truck to elevated position, and including means whereby the descent of the released truck platform may be checked and the skids gently lowered to the floor without disturbing the paper stack thereof. These and other objects, and their advantages, will be clearly apparent from the following description, in which reference is made to the accompanying drawing, forming a part of this specification, and in which—

Figure 1:
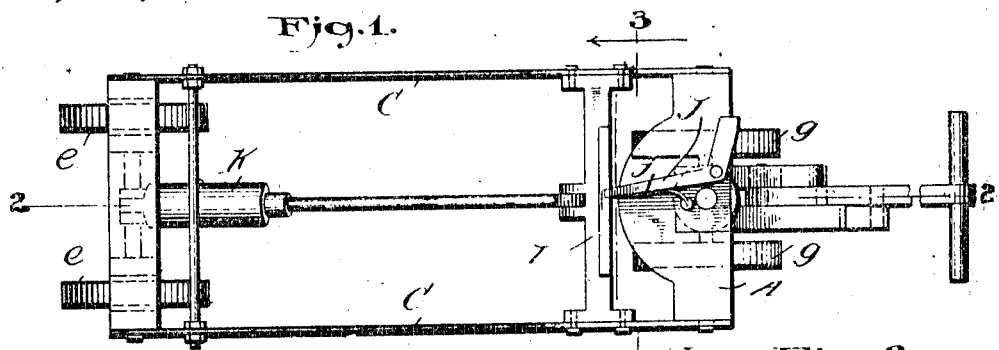
Figure 2:
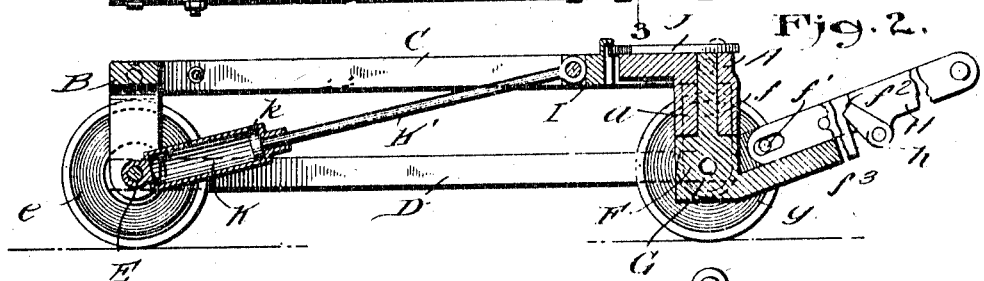
Figure 3:
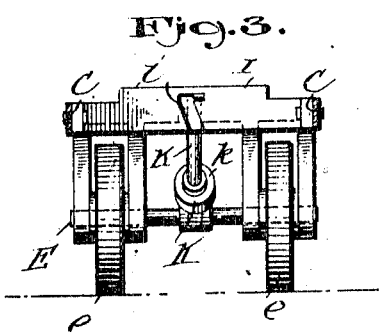
Figure 4:
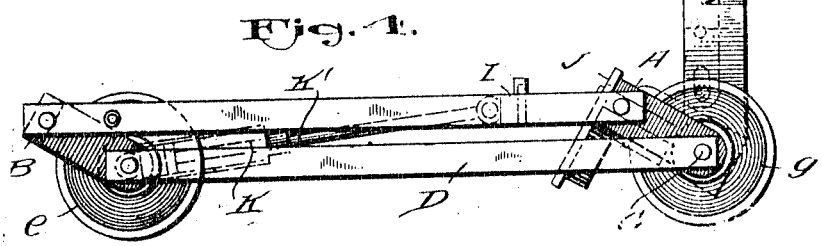

Figure 1 is a plan view of our improved truck. Fig. 2 is a vertical longitudinal section taken therethrough substantially on the line 2—2 of Fig. 1. Fig. 3 is a vertical transverse section taken therethrough substantially on the line 3—3 of Fig. 1. Fig. 4 is a side elevation illustrating the truck in lowered position.

Referring to the drawing, the truck comprises front and rear supports A and B carried by and swinging on axles G and E, respectively, as axes and pivotally connected with the sides of these supports A and B, which swing in parallelism, are the side bars C and C of the load-lifting and carrying platform, such bars being connected by transverse front and rear bars or beams I and I', and the axles are held spaced fixed apart by lower side bars D and D' which form reaches.

The forward support A is provided with a depending central portion $a$ through which is journaled the vertically up-standing king pin $f$ of the front wheel supporting member F, in which is the forward axle G on the ends of which are the forward wheels $g$ and being with the wheels $g$ located beneath the said forward support A and between the sides thereof. On the rear axle are wheels $e$. The member F is also provided with a forwardly and upwardly inclined extension $f^3$ having a slot and a transverse pin $f'$ extending across the slot, this slotted extension receiving the lower rear end of the handle H and the pin $f'$ projecting through a longitudinal slot in said end of the handle. The forward portion of the extension $f^3$ is provided with an angular shoulder $f^2$ and a lug $h$ pivoted on the handle H normally engages said shoulder in order to lock the handle to the extension. Thus when the handle H is raised, the forward and rear supports A and B will be turned down in a rearward direction and the platform lowered to a corresponding extent.

Extending between the upper side bars C at a point rearwardly of and adjacent the forward support A is the transverse beam I, the ends of which are rigidly connected to the said side bars, and the front face of which is provided with an inclined vertical slot $i$ having a horizontal extension at its upper end whereby a catch is formed. Thus the frame may be locked in raised position by means of a latch J pivotally mounted intermediate its ends upon the upper surface of the forward support A, and the rear nose of which is adapted when the platform is raised to enter the slot $i$ and slide up the inclined side of the catch and move into the horizontal extension thereof under actuation of its spring $j$ and rest on the top of the catch.

Extending between the beam I and the rear lower portion of the frame is a checking device consisting of a cylinder K, the rear end of which is journaled on the rear axle E, and the piston rod K' of which is hingedly connected at its forward end to the beam I, the cylinder K having an aperture $k$ adjacent its forward end whereby to permit the raising of the truck frame without resistance.

Thus from the foregoing, it will be seen that by rotating the lug $h$ out of engagement with the shoulder $f^2$, the handle H may be raised and lowered without causing corresponding movements of the truck frame or platform since the latch J locks the platform raised, this releasing of the handle being desirable where the load is being moved to an elevator or within other space in which the handle projecting as it normally does, would require greater space.

With the handle locked as shown, however, it will be seen that in order to lower the truck to the position shown in Fig. 4, it is necessary to rock the latching lever J on its pivot and against the tension of its spring j so as to move the same out of the horizontal extension of slot i, the several parts being thus free to lower under control of the checking device and against the resistance of the fluid in cylinder K. It will also be seen that by virtue of the particular manner in which we connect and mount the forward wheels, the truck may be readily turned and thus drawn from place to place without interfering with the load carried thereby, particularly the paper carrying skids to which our invention is particularly adapted.

We claim:

1. An elevating truck comprising a platform, front and rear axles, wheels on the axles, supports pivotally connected with the platform and carried by the axles, the forward support having an extension, a handle movably connected with the extension, a shoulder on the extension, and a latch device movably mounted on the handle and held by gravity in shoulder-engaging or shoulder non-engaging position; whereby the handle and said member can move as a unit for raising and lowering the platform when the latch engages the shoulder.

2. An elevating truck comprising front and rear axles, a platform, rear supporting means pivotally connected with the platform and the rear axle, front supporting means pivotally connected with the platform and front axle and also including a king pin, and interlocking devices arranged on the platform and on the front means to automatically engage as the platform is elevated and hold the platform in elevated position, one device being a spring-pressed member and the other an abutment with which the said member automatically engages at the end of the elevation of the platform and from which the said member is adapted to be released for permitting the platform to lower.

3. An elevating truck comprising a platform, parallel swinging supports on which the platform is mounted, wheels connected with the supports, a spring-pressed latch pivoted on the front support, and means on the platform having a slot into which the latch enters and interlocks as the platform is raised.

4. An elevating truck comprising a platform, front and rear supports to which the platform is pivotally connected on transverse axes, wheels supporting the supports, a latch on the front support and having a catch-engaging portion extending rearwardly from the pivotal axis between the platform and front support, and a catch on the platform with which the latch automatically engages.

5. An elevating truck comprising a platform, a body structure on which the platform is mounted, said structure including a swinging element provided with a forward extension, a handle pivotally connected with the extension, and having a limited longitudinal movement on the extension and latch means permanently carried by and movably mounted on the handle releasably engaged with the extension to cause the swinging element to swing with the handle.

6. An elevating truck comprising axles, wheels thereon, swinging supports on the axles, a platform on the supports, means for raising the platform, and means for retarding the lowering of the platform, said retarding means extending longitudinally of the truck with one end fastened to the rear axle and the other end fastened to the front portion of the platform and consisting of a piston and cylinder device.

EUGENE MERVIN CHAPMAN.
CHARLES EDWARD COWAN.

Witnesses:
URBAN ERNST,
GEORGE AHNERT.